US006539539B1

United States Patent
Larsen et al.

(10) Patent No.: US 6,539,539 B1
(45) Date of Patent: Mar. 25, 2003

(54) ACTIVE PROBES FOR ENSURING SOFTWARE PACKAGE COMPATIBILITY

(75) Inventors: Mark S. Larsen, Hoffman Estates, IL (US); Christopher D. Liesen, Naperville, IL (US); Alan R. Zorn, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/441,245

(22) Filed: Nov. 16, 1999

(51) Int. Cl.$^7$ .................................................. G06F 9/44
(52) U.S. Cl. ..................... 717/124; 379/9.01; 714/40; 717/121
(58) Field of Search .................... 717/4, 11, 1, 124, 717/121; 714/38, 48, 324, 379, 455, 39, 40, 400; 379/9.01

(56) References Cited

U.S. PATENT DOCUMENTS

| | | | | |
|---|---|---|---|---|
| 5,142,679 A | * | 8/1992 | Owaki et al. ................ 717/151 |
| 5,740,352 A | * | 4/1998 | Philipp et al. ................. 714/40 |
| 5,771,385 A | * | 6/1998 | Harper ......................... 395/704 |
| 5,799,143 A | * | 8/1998 | Butt et al. ..................... 714/38 |
| 5,815,653 A | * | 9/1998 | You et al. ..................... 714/38 |
| 5,826,005 A | * | 10/1998 | Fuller ........................... 714/38 |
| 5,867,710 A | * | 2/1999 | Dorris et al. ................ 717/124 |
| 5,901,315 A | * | 5/1999 | Edwards et al. ............ 395/704 |
| 5,918,004 A | * | 6/1999 | Anderson et al. ............. 714/38 |
| 6,154,876 A | * | 11/2000 | Haley et al. ................. 717/133 |
| 6,223,144 B1 | * | 4/2001 | Barnett et al. ................ 703/22 |
| 6,226,784 B1 | * | 5/2001 | Holmes et al. ................. 717/1 |
| 6,263,457 B1 | * | 7/2001 | Anderson et al. ............. 714/38 |
| 6,311,327 B1 | * | 10/2001 | O'Brien et al. ............. 717/114 |
| 6,405,364 B1 | * | 6/2002 | Bowman-Amuah ......... 717/101 |
| 6,425,006 B1 | * | 7/2002 | Chari et al. ................. 709/224 |
| 6,449,744 B1 | * | 9/2002 | Hansen ....................... 714/738 |

FOREIGN PATENT DOCUMENTS

| DE | 19506432 | * | 8/1996 | ........... G01R/33/02 |
| EP | 9641472 A1 | * | 12/1996 | |

OTHER PUBLICATIONS

"Visual Basic Programmer's Guide to the Win32 API", Dan Appleman, Sams Publishing, pp. 47–58, 126–129, 1476–1477, Feb. 2, 1999.*
Microsoft Press Computer Dictionary Third Edition, pp. 28,166,410, Published Sep. 19, 1997.*
IBM Dictionary of Computing, p. 225, Published Aug. 1993.*

* cited by examiner

Primary Examiner—Todd Ingberg
(74) Attorney, Agent, or Firm—Emrich & Dithmar

(57) ABSTRACT

In a distributed computer program, active software probes in the form of small functions built into an application are invoked by another application. When invoked, an active probe provides a positive response if the service being requested is available from the probed package. If the service is not available, the probe will fail alerting the software package installer that there is a problem. The active probes thus perform a functionality check for the software package, not a check merely based on the package's release number. Because the probe is active, it is capable of checking for subtending capabilities that the calling application may not realize are necessary for this service. This ensures full coverage of the test while hiding some implementation details from the calling application. By invoking these active probes upon installation of a new package, the installer can know immediately if the package has all services necessary to run correctly, thus reducing the possibility of a bad software package installation. The active software probes are thus capable of verifying software package compatibility at the time of program compilation as well as for program upgrades.

6 Claims, 4 Drawing Sheets

FIG. 1

CELLULAR TELEPHONE SWITCHING CENTER — 10

EXECUTIVE CELLULAR PROCESSOR — 12

APPLICATION PROCESSOR — 14
- RADIO CLUSTER SERVER
  - OSP
  (CONTAINS ACTIVE PROBES WHICH IDENTIFY NECESSARY AP FUNCTIONALITY)

ACTIVE PROBES FOR ENSURING SOFTWARE PACKAGE COMPATIBILITY

TECHNICAL FIELD

This invention relates generally to computer programs and is particularly directed to an active probe inserted in a software package to verify compatibility of the package with other applications with which it is intended to operate.

BACKGROUND OF THE INVENTION

In distributed software systems, the functionality of the system typically involves interaction between many different software packages or applications. In this modular software approach, it is possible to upgrade one package without upgrading others. A common example of this is the personal computer (PC). The various applications available in a PC, such as, spreadsheets, email and word processing, communicate and derive services from the PC's operating system (O/S). It is possible to upgrade one or more applications, e.g., install a new version of the word processing program or upgrade the operating system, e.g., change from Windows 95 to Windows 98, without replacing all of the software in the system.

A potential problem with this approach is in determining whether a given application will continue to work with other applications in the system after the application has been upgraded. In most cases, compatibility verification is determined by the installer of the software, typically by either checking written documentation associated with each package and/or trial and error. However, the documentation associated with a given software package, particularly if the package has undergone numerous changes or updates, is frequently not available, or even if available, is not current. The trial and error approach to verifying software package compatibility is labor intensive and thus expensive. This approach is also subject to human error, particularly when the new or revised package employs subtending functions from other operating software packages.

The present invention addresses the aforementioned limitations of the prior art by providing active probes in a software package which allow the installer of the package to determine immediately at the time of installation of the new package if the associated software has all the services necessary to correctly run the new software package.

SUMMARY OF THE INVENTION

This invention contemplates active software probes in the form of small functions built into an application package that can be invoked by another application. When invoked, the probes return a positive response if the service being requested is available from the probed software package. If the service is not available, the probe will fail alerting the installer that something is not right. Because the probe is active, it can check for subtending capabilities that the calling application may not realize are necessary for this service. For example, application A knows that it needs capability X to operate correctly. When application A starts, it calls the probe for capability X and, if it gets a positive response, application A continues its operation. The probe for capability X may have encoded into it that it needs capability Y to satisfy the needs that application A has requested. In this case, the active probe for X will call for probe for Y to ensure that X application A can be fully satisfied. This ensures full coverage of the test while hiding some implementation details of each probed capability from the calling application. By invoking these active probes upon installation of a new software package, the installer learns immediately if the software package has all services necessary to run correctly. The active probe approach of the present invention is thus based on a functionality test, rather than the release number of a particular software package. This allows software applications to probe for desired functionality without a priori knowledge of the contents of a given release. The active probes are also capable of testing for subtending capabilities of the probed application with other software applications. The ability to test for subtending capabilities allows for implementation details of the probed application to be hidden from the calling application while ensuring complete identification of application coverage.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is a simplified block diagram showing an executive cellular processor and an application processor in a cellular telephone switching center which is one example of where the active software probes of the present invention may be used for ensuring software package-to-package compatibility;

DETAILED DESCRIPTION OF THE PREFERRED EMBODIMENT

Figure 2:
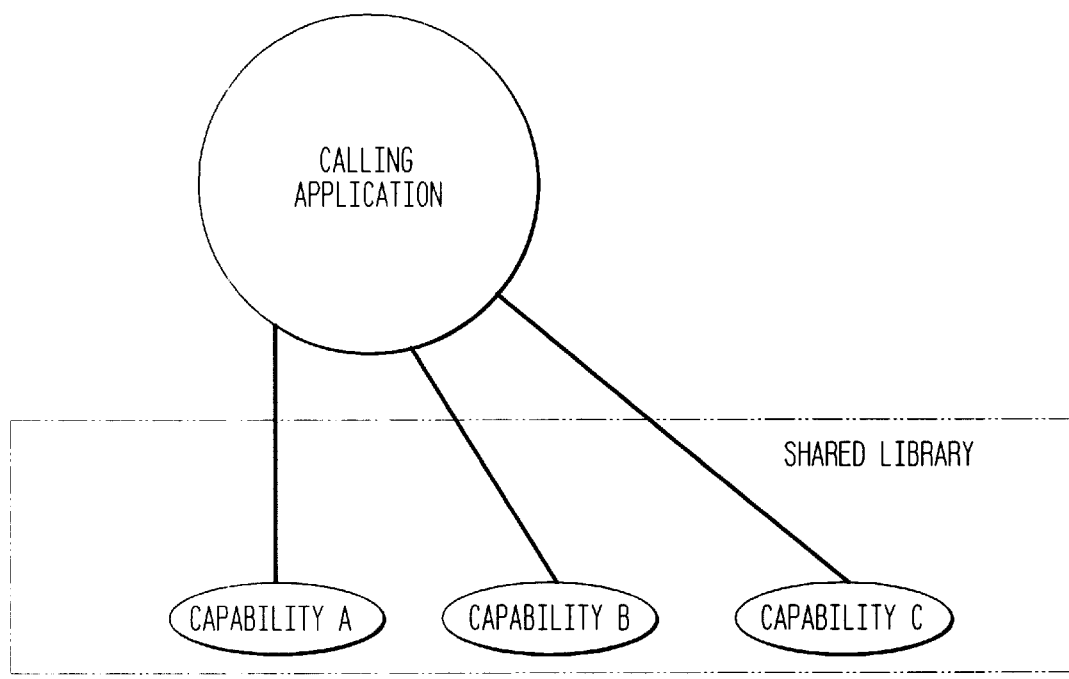
FIG. 2 is a simplified schematic diagram showing the dependency of a software application on a shared library in carrying out multiple capabilities or functions.

Referring to FIG. 1, there is shown a simplified block diagram of a cellular telephone switching center 10 which includes an executive cellular processor (ECP) 12 and an application processor 14. The cellular telephone switching center 10 interconnects the cellular telephone system with a public switched telephone network (PSTN). The cellular telephone switching center 10 also switches calls between different cell cites in real time as a mobile unit moves from the coverage area of one cell to another. This process is known as a "call handoff." In addition, the cellular telephone switching center 10 performs a paging function in support of call delivery since the system usually does not know which cell area the idle mobile is in at the time a call enters into the network.

The ECP 12 controls various functions in the cellular telephone switching center 10 including assigning specific voice channels for each call and storing charging information from call processing and database modes (not shown). The application processor 14 is coupled to and interfaces with the ECP 12. The application processor 14 runs various computer programs including a radio cluster server (RCS). The RCS includes an OSP operating program which is also run on the application processor 14. It is in the OSP program that the active probes of the present invention are incorporated. However, while the active software probes of the present invention are disclosed in terms of use in a cellular telephone switching center, the present invention is not limited to this application and may be used in virtually any distributed software system where an application interfaces with one or more other software applications.

In the past, much of the functionality alignment information for a given OSP release was buried in its name. As the interfaces between the ECP/AP and the OSP evolved, the logistics of using names for application titles became unwieldy, making it more difficult to design auto-detection functionality into the software package. A more efficient implementation employs the active software probes of the present invention which are based upon the use of null functions in the shared library with reference to these symbols in the RCS application program. Using the Bind Immediate link option, the RCS application program will fail if all the necessary probe symbols are not available in the shared library. The present invention employs this immediate binding and, by making the probes functional, also provides for nesting and the ability to add logging and debugging to the software probes. The Bind Immediate link option has the advantage of providing an immediate failure indication if the required function is not available in the probed software package. However, the present invention is not limited to use with the Bind Immediate option and will work without this feature. The software loader performs the first test for capability when the RCS is first initialized. If any symbols of the RCS application program cannot be resolved, the RCS application program will fail. If all the symbols do resolve, the software probes will be executed early in the OSP initialization. This ensures that the probes will still be checked in case the RCS application program was not constructed using immediate binding. This also gives the software probe designer the option for nesting probes based on necessary groups of functionality that are interdependent.

The software probes are run by the RCS application program by executing probe classes built into the shared library. The actual functionality is part of the shared library, with only the invocation of the probe being part of the RCS application program. This allows for the addition of more probes in later versions of the shared library without interrupting older RCS application programs. To aid in testing the probes in evaluating their ongoing necessity, the probes send an output to the debug log. A value can be passed to the probe to define which, debug log should be used or if no error reporting should be used. To hide some details of the implementation of the RCS application program from end users, the probes may be programmed to call other probes. This is done only if the functionality represented by the calling probe requires the functionality represented by the called probe. In cases where software application nesting is used, the calling probe employs a scheme to protect it from getting into an infinite recursive loop as described below. The probe base class contains the following:

- The "probe" member function that is invoked indirectly by the probing application;
- State machine to control infinite nesting, as described below;
- A "report" member function for presenting information about the status of the probe;
- Private data including the debug level, state and name of the probe; and
- A null version of the "subtending" member function which is overloaded in the derived class if the probe needs subtending probes.

Each probe is a derived class of the base probe class. This is necessary to ensure that the state is managed correctly and that the name, which is printed by the report function, is unique. As mentioned, if a probe must call other probes, it overloads the "subtending" member function to, make these calls. Each probe is an instance of the derived base class for that probe. To keep the interface to the calling application simple, an external function is defined which invokes the "probe" member function of the derived class. All class characteristics of the probes are hidden from the calling application. The calling application simply invokes the instance of the probe and passes it a debug level for reporting purposes. In one implementation, the debug level is defaulted to OFF.

Referring to FIG. 2, there is shown a simplified schematic diagram of the dependency of a software application on a shared library in carrying out multiple capabilities or functions. Software applications often use software that is made available in shared libraries which are shared among various applications. Examples of such shared libraries are printer or disk interfaces, communications software, and video card interfaces. Applications are constructed assuming the availability of the capabilities in the shared library. If a capability is not within the shared library, e.g., a different version of the shared library is installed, the application will "crash" when trying to access that capability. This often occurs at unpredictable times. As shown in FIG. 2, the calling application makes use of capabilities A, B and C, all located within the shared library.

Figure 3:
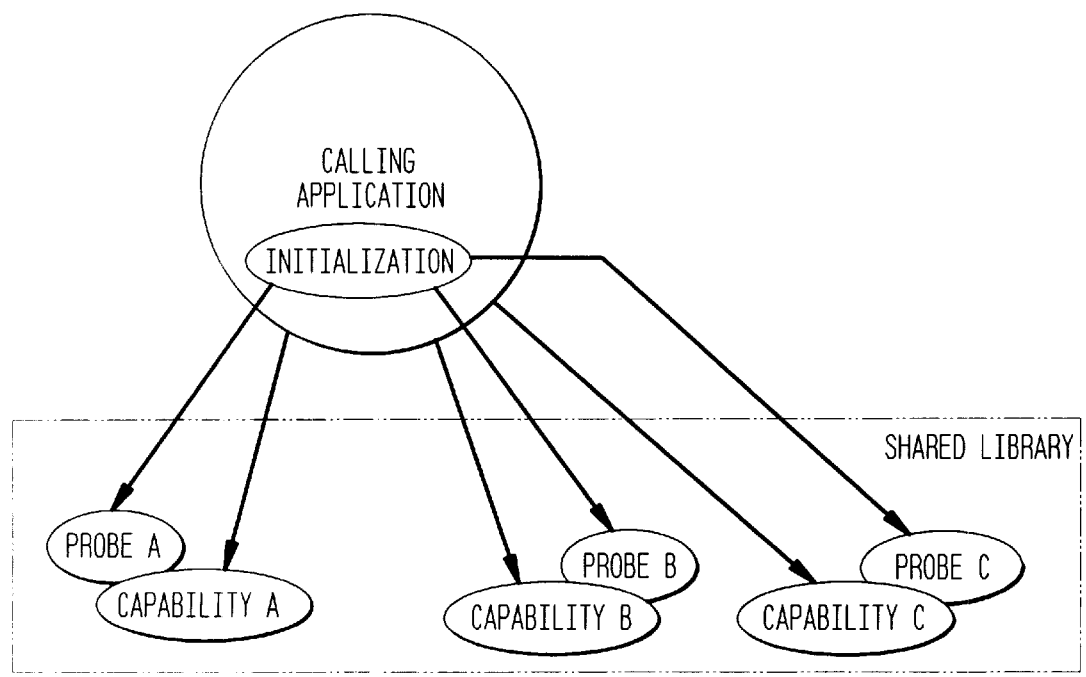
FIG. 3 is a simplified schematic diagram showing the use of active software probes in verifying the capability of a software application with multiple capabilities in a shared library in accordance with the present invention.

Referring to FIG. 3, there is shown a simplified schematic diagram of the use of active software probes in verifying the capability of a software application with multiple capabilities in a shared library in accordance with the present invention. Again, the calling application is shown as making use of capabilities A, B and C, all located within the shared library. Active probes are installed in each of the software applications by providing these capabilities. For example, probe A is installed in the software application providing capability A, while probes B and C are respectively provided in the software applications providing capabilities B and C. Each of the active software probes is a small piece of software associated with each capability in the shared library. When the calling application is initialized and starts to run, it executes the probes for each capability that it needs. Thus, the calling application when initialized sends out a query to probe A in the application providing capability A within the shared library. The calling application then waits for a positive response from probe A indicating that the required capability A is available in the shared library. The calling application also sends out queries for probes B and C and awaits positive responses from capabilities B and C in the shared library. In the event a required probe is not available, a probe failure indication tells the calling application that it does not have the correct shared library. This allows the application to fail on initialization for a known, repairable, reason.

Figure 4:
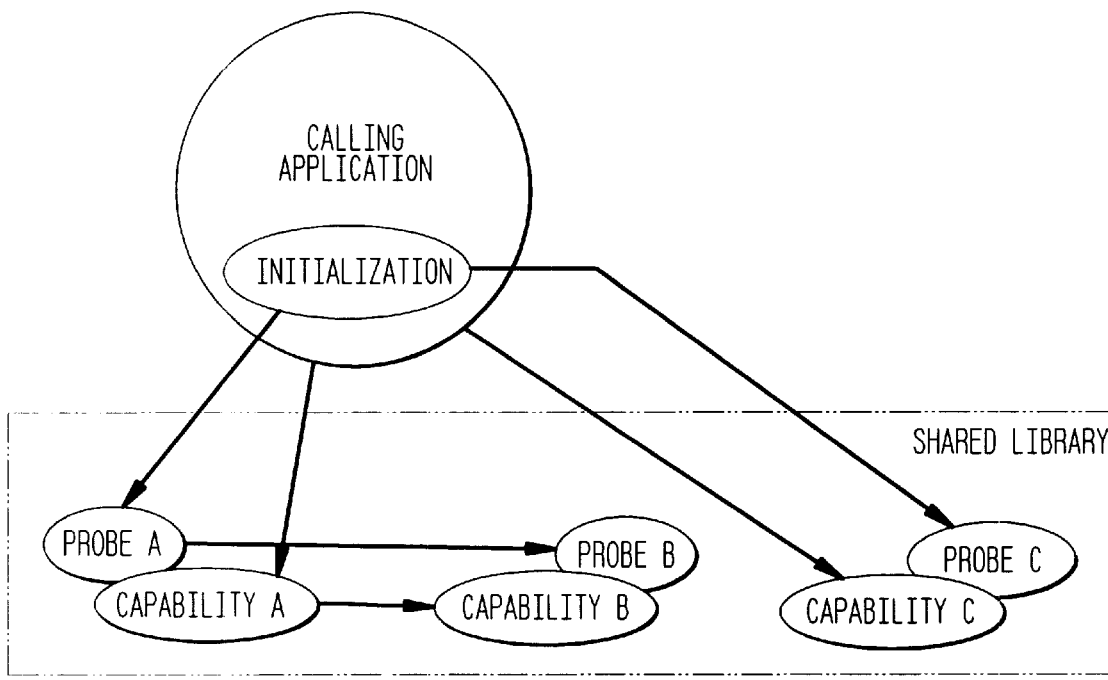
FIG. 4 is a simplified schematic diagram showing the use of subtending probes in verifying the capability of a software application with multiple capabilities or functions in a shared library.

Referring to FIG. 4, there is shown a simplified schematic diagram of the use of subtending probes in verifying the capability of a software application with multiple capabilities or functions in a shared library in accordance with another aspect of the present invention. In some cases, a capability, such as capability A, in the shared library will need another capability B in the shared library for proper operation. The calling application will typically be unaware of this capability dependency. To ensure that the calling application receives the proper service, probe A will invoke probe B as shown in FIG. 4 to ensure that both capabilities A and B are available to the calling application. Failure of either probe A or probe B is reported to the calling application as a failure. In the situation illustrated in FIG. 4, the steps carried out for a verified capability would be as follows:

Calling application calls Probe A;

Probe A calls Probe B;

Probe B responds "success" to Probe A; and

Probe A responds "success" to the calling application.

The calling application does not know that its successful operation depends upon capability B, but probe A has ensured that it has all it needs to properly handle the calling application's needs.

Figure 5:
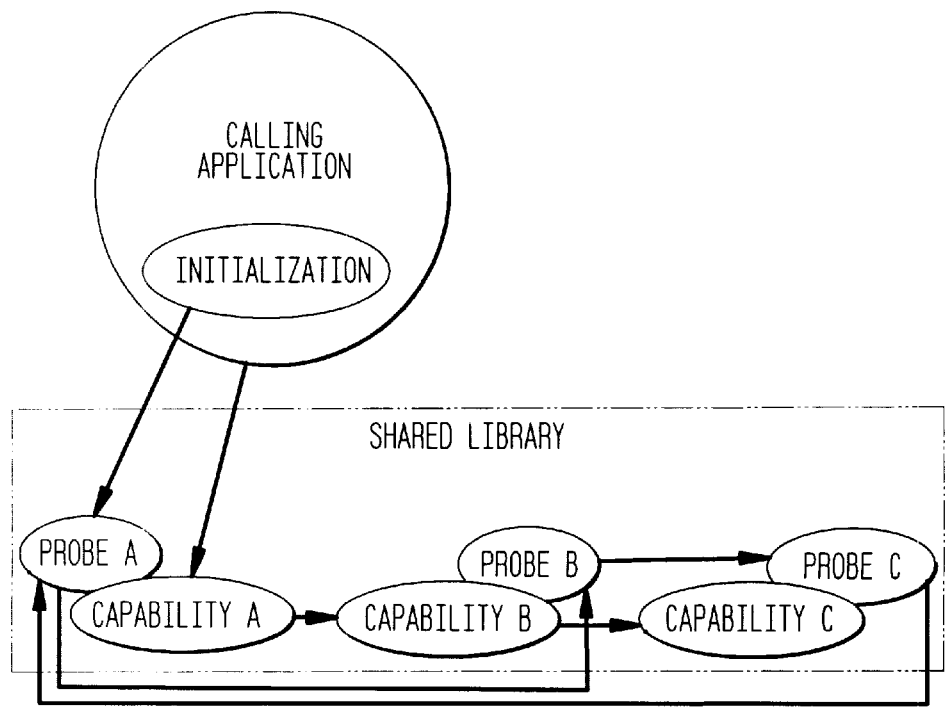
FIG. 5 is a simplified schematic diagram showing the use of subtending probes in verifying the compatibility of a software application with multiple capabilities in a shared library illustrating the potential of creating an infinite loop of subtending probes.

Referring to FIG. 5, there is shown a simplified schematic diagram of the use of subtending probes in verifying the capability of a software application with multiple capabilities in a shared library illustrating the potential of creating an infinite loop of subtending probes. A potential risk of subtending probes is that of creating an infinite loop. In the situation shown in FIG. 5, capability A requires capability B which requires capability C which, in turn, requires capability A. This is a common situation in many software applications as each of these capabilities may be of substantial complexity. If the software probes were simply to call their subtending probes, probe A would call probe B, probe B would call probe C, probe C would call probe A, probe A would call probe B again, and so on. The active probes of the present invention include a state machine which allows the probe to determine if it is being called as at result of such recursion. If a probe is called when it is already running (such as probe A being called by probe C), it will return "success" without calling its subtending probes, thus ending the infinite loop. A series of operations in this case would be as follows:

Application calls probe A;

Probe A calls probe B;

Probe B calls probe C;

Probe C calls probe A;

Probe A responds "success" to probe C;

Probe C responds "success" to probe B;

Probe B responds "success" to probe A; and

Probe A responds "success" to the calling application.

Figure 6:
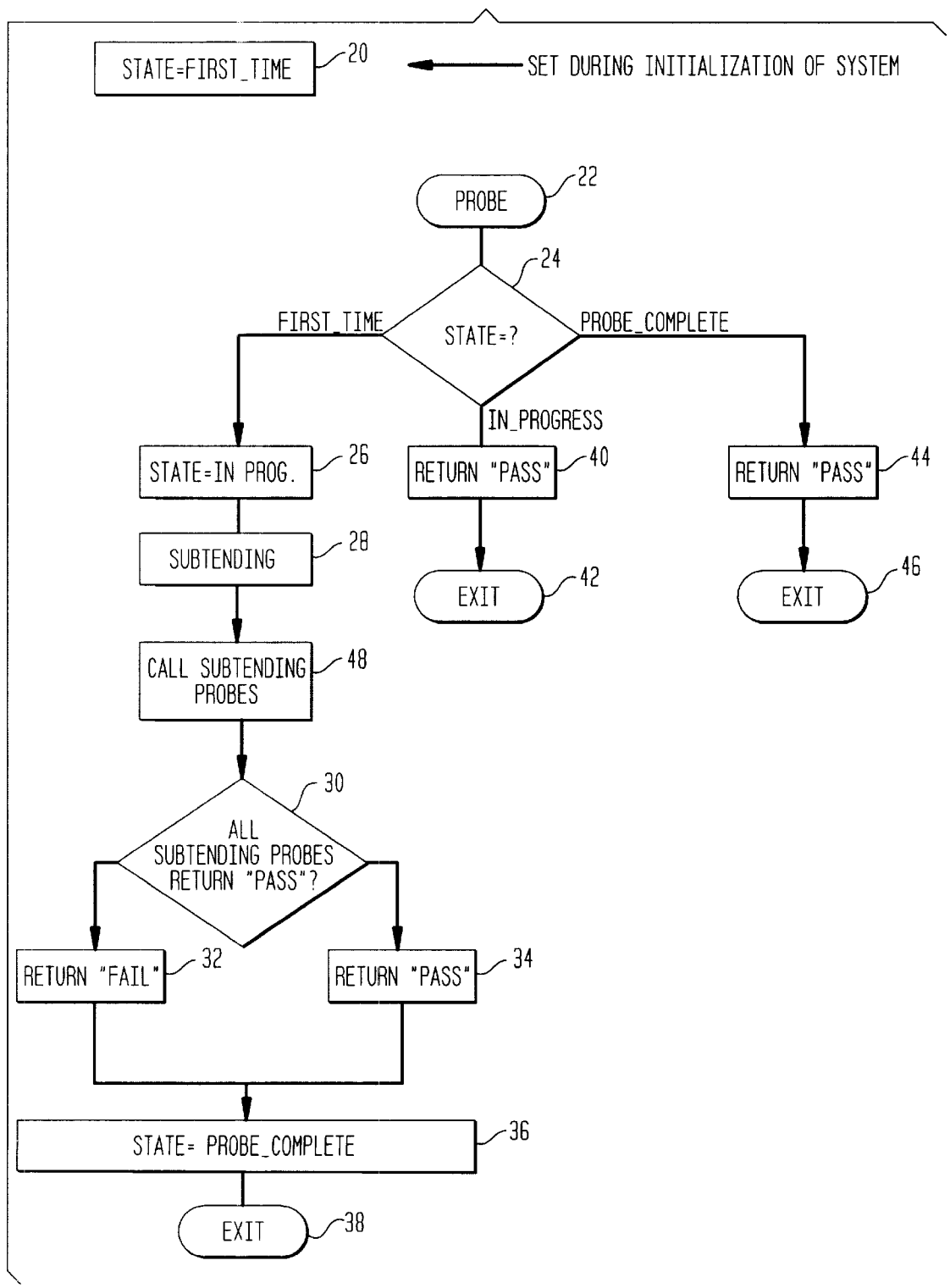
FIG. 6 is a simplified flowchart illustrating the steps carried out in using an active software probe for verifying compatibility between different software applications, including checking subtending probes among several software applications.

Referring to FIG. 6, there is shown a simplified flowchart of the steps taken in carrying out a method involving the active software probes of the present invention. The sequence of steps shown in FIG. 6 is carried out by a computer program within the OSP in the application processor and covers the use of subtending probes among several software applications. A state variable is set to FIRST_TIME during initialization of the system at step 20.

The probe function is then initiated at step 22, followed by a determination of the state variable of the calling application at step 24. In cases where nesting of applications is used, the calling application uses a scheme to protect it from getting into an infinite loop. While it is possible for capabilities to have recursive dependencies, building recursive logic into the probes is not feasible. The active software probes avoid infinite loops by using a state variable named after the probe. This static integer can take on one of three values as shown in TABLE I.

TABLE I

| Recursion Flag Value | Probe State |
|---|---|
| ProbeRecursFirstTime | Probe has not been run |
| ProbeRecursInProgress | Probe is running and has called other probes |
| ProbeRecursComplete | Probe has run to completion |

If at step 24, it is determined that the probe has not yet been run, the program proceeds to step 26 for setting the state variable to IN_PROGRESS. This ensures that the probe is running and has called other probes. At step 28, the subtending probe routine is initiated. The program then calls all subtending probes at step 48 and collects the responses from the probes. The program then at step 30 determines the response of each of the subtending probes. If all of the subtending probes return a "PASS" as determined at step 30, the program branches to step 34 and returns a "PASS" to the probe function indicating to the calling application that all of the subtending capabilities in the shared library are present and available. Following the return of a "PASS" indication to the calling application, the program then sets the state variable to PROBE_COMPLETE and exits the active probe function subroutine at step 38. If at step 30 it is determined that not all of the subtending probes have returned a "PASS," indicating that some of the subtending probes have failed, the program returns a "FAIL" at step 32 to the calling application and exits the probe function subroutine at step 38.

If at step 24 the state variable is determined to be IN_PROGRESS, i.e., the probe is running and has called other probes, the program proceeds to step 40 and automatically returns a "PASS" to the calling application indicating that the calling application and the called application are compatible. The IN_PROGRESS state indicates that the subtending probe is already running and that the called application containing the subtending probe is capable of operating with the calling application. Following return of a "PASS" indication to the calling application at step 40, the program then exits the probe function subroutine at step 42.

If at step 24, it is determined that the state variable is set to PROBE_

COMPLETE, i.e., the active software probe has run to completion, the program then proceeds to step 44 and provides a return "PASS" to the calling application. The program then exits the probe function subroutine at step 46. If a probe is called after it has run, as indicated by the state variable being set to PROBE_COMPLETE, it will return "PASS." Thus, any subsequent calls to a probe after the probe has run will result in the probe returning "PASS" without executing subtending probes. This is done to save time during initialization of a large number of applications.

In the situation where there are three probes A, B and C, with B being a subtending probe for probe A, C being a subtending probe for probe B, and A being a subtending probe for probe C, the program avoids a recursive loop in the following manner. The second time a probe is queried it is by the application which provides a function essential to the operation of the application associated with the queried probe rather than by the calling application. In the present case, this would involve probe C querying probe A. When probe A is queried by probe C, it determines that the state variable is IN_PROGRESS. In this event, the program does not call probe B again, but rather returns a "PASS" to probe C which then exits the probe function program at step 42. This is an indication to the program that the end of a recursive loop has been reached. The program then queries probes C, B and A in that order to permit each probe to return a "PASS," followed by exiting of the probe function subroutine.

As a specific example of the use of the present invention, the inventive active software probes are employed in a radio controller that operates in a multitasking environment on a commercial processor platform. In order to operate correctly, the radio controller (RC) must be able to get accurate real-time measurements. A shared library (SL) that executes commands on request from the RC provides real-time measurements. The RC must know before it starts to execute that the SL has the correct version of real-time functions. To allow the RC to check this without having a priori knowledge of the SL's version or manufacture date, an active probe, the RTprobe, was built into the SL and defined as an external function for the RC. This allows the RC to compile correctly by linking the RC and SL at run time. When the RC starts running, it executes the RTprobe from the SL. If the RTprobe does not exist in the currently installed version of the SL, a failure signal is returned to the RC and it would terminate. If the RT probe does exist in the currently installed version of the SL, a success signal is returned to the RC and the RC proceeds with normal operation. Table II includes a detailed listing of these functions in the Radio Cluster Server's OSP operating program.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

TABLE II-A

```
//
// EX_CLASS_probe.cc
// -*-Mode: C++; -*-
#include "EX_Probe_defs.h"
#include "EX_CLASS_probe.h"
#include "ux/UXmacs_com.h"
enum
{
    PROBE_FIRST_TIME,
    PROBE_IN_PROGRESS,
    PROBE_COMPLETE,
    // Leave this last . . .
    PROBE_COMPLETE_MAX
};
// constructor with optional debug string
// The string from name is not duplicated, just the pointer is
// copied. So only use strings that are static
EX_CLASS_probe::EX_CLASS_probe(const char *name)
    : m_name(name)
    , m_state(PROBE_FIRST_TIME)
    , m_dbg_lvl(ProbeDbg_OFF)
```

TABLE II-A-continued

```
{
    // Nothing else to do.
}
// Call the probe for the class. This call will call the protected
// method subtending( ). If there is a problem, return PROBE_FAILURE;
// otherwise return PROBE_SUCCESS.
int
EX_CLASS_probe::probe(int dbg_lvl)
{
    m_dbg_lvl = dbg_lvl;
    switch (m_state)
    {
        case PROBE_FIRST_TIME:
        {
            int rtn_value;
            report ( );
                m_state = PROBE_IN_PROGRESS;
                rtn_value = subtending(dbg_lvl);
                m_state = PROBE_COMPLETE;
            report ( );
                return rtn_value;
        }
        break;
        case PROBE_IN_PROGRESS:
        {
            report ( );
                return PROBE_SUCCESS;
        }
        break;
        case PROBE_COMPLETE:
        {
```

TABLE II-B

```
            report ( );
                return PROBE_SUCCESS;
        }
        break;
        default:
        {
            m_state=PROBE_FIRST_TIME;
            report ( );
                return PROBE_FAILURE;
        }
    }
}
// Call the subtending probes for the class. This can be called only
// by an insider, or a derived class. If there is a problem, return
// PROBE_FAILURE; otherwise return PROBE_SUCCESS.
int
EX_CLASS_probe::subtending(int dbg_lvl)
{
    int rtn_value = PROBE_SUCCESS;
    int kill_warning = dbg_lvl;
    // inserted to eliminate compiler whining
    //rtn_value = SUBTENDING PROBES
    return rtn_value;
}
// Output status of what's going on in the probe. m_dbg_lvl is passed to
// the invocation of probe.
void
EX_CLASS_probe::report( )
{
    switch (m_dbg_lvl)
    {
        case ProbeDbg_OFF:
            // No output
            break;
        case ProbeDbg_UXDLOG:
            UX_DLOG("Probe: %s - State: %d", m_name, m_state);
            break;
        case ProbeDbg_UXDLOG1:
            UX_D1LOG("Probe: %s - State: %d", m_name, m_state);
            break;
```

TABLE II-B-continued

```
    case ProbeDbg_UXDLOG2:
        UX_D2LOG("Probe: %s - State: %d", m_name, m_state);
        break;
    case ProbeDbg_UXDLOG3:
        UX_D3LOG("Probe: %s - State: %d", m_name, m_state);
        break;
    default:
        break;
    }
    return;
}
```

TABLE II-C

```
//
// File: EX_SUGRmacs_probe.cc
//
// Description: Probe class derived from
EX_CLASS_probe
//   This probe verifies the existence of
P1 capabilities in EX_SUGRmacs.
// -*-Mode: C++; -*-
#include "EX_SUGRmacs_probe.h"
#include "EX_Probe_defs.h"      // Probe interfaces
// default constructor.
SUGRmacs_probe_P1::SUGRmacs_probe_P1(void)
    : EX_CLASS_probe("SUGRmacs P1 probe")
    // invoke probe with default name
{
    // Nothing else to do.
}
// constructor vith optional debug string
SUGRmacs_probe_P1::SUGRmacs_probe_P1(const char *name)
// invoke probe with "name"
    : EX_CLASS_probe(name)
{
    // Nothing else to do.
}
// Call the subtending probes for the class. This can be called only
// by an insider, or a derived class. If there is a problem, return
// PROBE_FAILURE; otherwise return PROBE_SUCCESS.
int
SUGRmacs_probe_P1::subtending(int dbg_lvl)
{
    int rtn_summary = PROBE_SUCCESS;
    // accumulate failed probe info
    {
        // Check for APports portability 1
        int rtn_value = ProbeUTrccIntfP1(dbg_lvl);
        if (rtn_value != PROBE_SUCCESS)
        {
            rtn_summary = rtn_value;
        }
    }
    return rtn_summary;
```

We claim:

1. For use in a distributed computer program wherein a first software package interacts with a second software package, with said second software package performing a first function essential to the operation of said first software package, a method for determining the compatibility of the first and second software packages, said method comprising the steps of:

incorporating an active software probe in the second software package, wherein said active software probe is inserted in the software for performing said function;

providing a first inquiry from the first software package to the second software package to determine if said first function is in said second software package;

providing a first signal from said second software package to said first software package if said first function is in said second software package indicating that the first and second software packages are compatible or providing a second signal from said second software package to said first software package indicating that said first function is not in said second software package and that the first and second software packages are not compatible; and automatically terminating said method following the providing of said fifth signal from the first software package to the third software package to avoid a recursive loop among the first, second and third software packages.

2. The method of claim 1 wherein said distributed computer program further includes a third software package, with said third software package performing a second function essential to the operation of said second software package, said method further comprising the steps of:

providing a second inquiry to the third software package;

providing a third signal from said third software package to said second software package if said second function is in said third software package indicating that the second and third software packages are compatible or providing a fourth signal from said third software package to said second software package indicating that said second function is not in said third software package and that said second and third software packages are not compatible.

3. The method of claim 2 wherein the first software package performs a third function essential to operation of said third software package, said method further comprising the steps of:

providing a third inquiry from said third software package to said first software package to determine if said third function is in said first software package; and providing a fifth signal from said first software package to said third software package if said third function is in said first software package indicating that said third and first software packages are compatible or providing a sixth signal from said first software package to said third software package indicating that said third function is not in the first software package and that the third and first software packages are not compatible.

4. The method of claim 1 wherein said first, second and fifth signals are designated PASS signals and said second, fourth and sixth signals are designated FAIL signals.

5. The method of claim 1 further comprising the steps of:

incorporating said active software probe in plural software packages, wherein each of said plural software packages performs a respective function essential to operation of the first software package;

providing said first inquiry to said plural software packages to determine if each respective function is in one of said plural software packages; and providing a third signal from said plural software packages to said first software package if said functions are in said plural software packages indicating that the first software package and said plural software packages are compatible or providing a fourth signal from said plural software packages to said first software package indicating that said functions are not in said plural software packages and that the first software package and said plural software packages are not compatible.

6. The method of claim 1 further comprising the step of utilizing a bind immediate function in the computer program for providing said second signal immediately upon the determination that said first function is not in said second software package.

* * * * *